(12) United States Patent
Jiang et al.

(10) Patent No.: US 10,656,487 B2
(45) Date of Patent: May 19, 2020

(54) ARRAY SUBSTRATE WITH PATTERNED LIGHT-BLOCKING LAYER FOR PREVENTING REFLECTION OF AMBIENT LIGHT, MANUFACTURING METHOD THEREOF, CORRESPONDING DISPLAY PANEL AND DISPLAY DEVICE

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Liangliang Jiang, Beijing (CN); Quan Gan, Beijing (CN); Lei Guo, Beijing (CN); Ke Dai, Beijing (CN); Yongjun Yoon, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 3 days.

(21) Appl. No.: 15/758,700

(22) PCT Filed: Sep. 6, 2017

(86) PCT No.: PCT/CN2017/100710
§ 371 (c)(1),
(2) Date: Mar. 8, 2018

(87) PCT Pub. No.: WO2018/129939
PCT Pub. Date: Jul. 19, 2018

(65) Prior Publication Data
US 2019/0041709 A1 Feb. 7, 2019

(30) Foreign Application Priority Data
Jan. 13, 2017 (CN) .......................... 2017 1 0024752

(51) Int. Cl.
*G02F 1/136* (2006.01)
*G02F 1/1362* (2006.01)
*G02F 1/1368* (2006.01)

(52) U.S. Cl.
CPC .. *G02F 1/136286* (2013.01); *G02F 1/136209* (2013.01); *G02F 1/1368* (2013.01); *G02F 2001/136295* (2013.01)

(58) Field of Classification Search
CPC ................................................. G02F 1/136286
See application file for complete search history.

(56) References Cited

U.S. PATENT DOCUMENTS

| 7,259,806 B1 | 8/2007 | Lee et al. | |
| 2004/0012753 A1* | 1/2004 | Udaka | G02B 5/005 349/187 |

(Continued)

FOREIGN PATENT DOCUMENTS

| CN | 101051143 A | 10/2007 |
| CN | 102981329 A | 3/2013 |

(Continued)

OTHER PUBLICATIONS

International Search Report received for PCT Patent Application No. PCT/CN2017/100710, dated Dec. 6, 2017, 8 pages (3 pages of English Translation and 5 pages of Original Document).

(Continued)

*Primary Examiner* — Nduka E Ojeh
*Assistant Examiner* — Laura M Dykes
(74) *Attorney, Agent, or Firm* — Womble Bond Dickinson (US) LLP

(57) ABSTRACT

The present disclosure relates to the field of display technologies, and provides an array substrate, a manufacturing method thereof, and a corresponding display panel and display device. The array substrate includes a display area (Continued)

and a non-display area, wherein the display area includes a plurality of pixel regions and a pixel definition region between various pixel regions. Furthermore, the array substrate further includes a base substrate, as well as a patterned metal layer and a patterned light-blocking layer superimposed in the pixel definition region on the base substrate, wherein the patterned light-blocking layer is closer to a light incident side of the array substrate than the patterned metal layer is, and the patterned light-blocking layer is made of a non-metallic material. Besides, an orthogonal projection of the patterned light-blocking layer on the pixel definition region at least partially overlaps that of the patterned metal layer on the pixel definition region.

12 Claims, 5 Drawing Sheets

(56) References Cited

U.S. PATENT DOCUMENTS

| | | | |
|---|---|---|---|
| 2004/0119901 A1 | 6/2004 | Kang | |
| 2006/0017864 A1 | 1/2006 | Chae | |
| 2007/0229733 A1* | 10/2007 | Suh | G02F 1/1339 |
| | | | 349/96 |
| 2008/0239187 A1* | 10/2008 | Yang | G02F 1/136209 |
| | | | 349/44 |
| 2012/0242943 A1* | 9/2012 | Sun | G02F 1/133514 |
| | | | 349/144 |
| 2013/0057801 A1* | 3/2013 | Park | G02F 1/133308 |
| | | | 349/58 |
| 2017/0242284 A1 | 8/2017 | Yang et al. | |
| 2018/0157113 A1* | 6/2018 | Cheng | G02F 1/133528 |
| 2018/0364530 A1 | 12/2018 | Wang et al. | |

FOREIGN PATENT DOCUMENTS

| | | |
|---|---|---|
| CN | 103293765 A | 9/2013 |
| CN | 103365013 A | 10/2013 |
| CN | 104793418 A | 7/2015 |
| CN | 105572998 A | 5/2016 |
| CN | 105676526 A | 6/2016 |
| CN | 205301754 U | 6/2016 |
| CN | 105739166 A | 7/2016 |
| CN | 205485205 U | 8/2016 |
| CN | 107037648 A | 8/2017 |
| KR | 10-2004-0005040 A | 1/2004 |

OTHER PUBLICATIONS

Office Action received for Chinese Patent Application No. 201710024752.5, dated Apr. 30, 2019, 25 pages (14 pages of English Translation and 11 pages of Office Action).

* cited by examiner

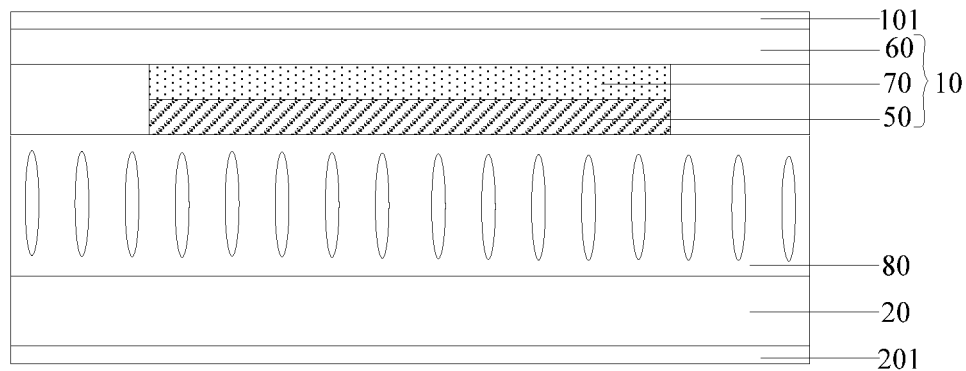

Fig. 5 forming a non-metallic light-blocking thin film on the base substrate, and forming a patterned light-blocking layer in the pixel definition region by a patterning process — S100 forming a patterned metal layer on a light incident side of the patterned light-blocking layer, wherein an orthogonal projection of the patterned light-blocking layer on the pixel definition region at least partially overlaps that of the patterned metal layer on the pixel definition region — S101

Fig. 6

ARRAY SUBSTRATE WITH PATTERNED LIGHT-BLOCKING LAYER FOR PREVENTING REFLECTION OF AMBIENT LIGHT, MANUFACTURING METHOD THEREOF, CORRESPONDING DISPLAY PANEL AND DISPLAY DEVICE

CROSS REFERENCE TO RELATED APPLICATIONS

The present application claims the priority of the Chinese patent application No. 201710024752.5 filed on Jan. 13, 2017, the disclosure of which is incorporated herein by reference in its entirety.

TECHNICAL FIELD

The present disclosure relates to the field of display technologies, and in particular to an array substrate, a manufacturing method thereof, as well as a corresponding display panel and display device.

BACKGROUND ART

At present, liquid crystal displays (LCDs) are used more and more widely due to their advantages, such as low power consumption, miniaturization, thinness and light weight.

A liquid crystal display device comprises a liquid crystal display panel and a backlight source. Typically, in a liquid crystal display device, gate lines and data lines are mostly formed of metallic materials with a high conductivity, such as aluminum (Al) or copper (Cu), in order to promote the charging rate of pixels and reduce the line width and the resistance of wires. Meanwhile, in a liquid crystal display device, a bezel covers a relatively large area. As a result, the bezel of the liquid crystal display device has a large overall size, and hence a narrow bezel design cannot be achieved. The high reflectivity of the metallic materials and the blocking of light by the bezel may both potentially reduce the quality and contrast of the product.

SUMMARY

Embodiments of the present disclosure provide an array substrate, a manufacturing method thereof, as well as a corresponding display panel and display device, so as to eliminate or at least partially alleviate one or more of the defects as mentioned above.

According to an embodiment of the present disclosure, an array substrate is provided. Specifically, the array substrate comprises a display area and a non-display area, wherein the display area comprises a plurality of pixel regions and a pixel definition region between various pixel regions. Furthermore, the array substrate further comprises a base substrate, as well as a patterned metal layer and a patterned light-blocking layer superimposed in the pixel definition region on the base substrate, wherein the patterned light-blocking layer is closer to a light incident side of the array substrate than the patterned metal layer is, and the patterned light-blocking layer is made of a non-metallic material. Besides, an orthogonal projection of the patterned light-blocking layer on the pixel definition region at least partially overlaps that of the patterned metal layer on the pixel definition region.

Optionally, in a specific embodiment of the array substrate provided by the present disclosure, the patterned light-blocking layer of the array substrate is configured to block visible light. Alternatively, in other embodiments, the patterned light-blocking layer is configured to only allow passage of light in one polarization direction.

Optionally, in a specific embodiment of the array substrate provided by the present disclosure, the patterned light-blocking layer is made of a rod quantum dot material and only allows passage of light in one polarization direction. In this embodiment, furthermore, a long-axis direction of the rod quantum dots is the same as the polarization direction of light that is allowed to pass.

Optionally, in a specific embodiment of the array substrate provided by the present disclosure, the patterned light-blocking layer is made of black resin and configured to block visible light.

Optionally, in a specific embodiment of the array substrate provided by the present disclosure, an orthogonal projection of the patterned light-blocking layer on the pixel definition region completely covers that of the patterned metal layer on the pixel definition region.

Optionally, in a specific embodiment, the patterned light-blocking layer is formed between the patterned metal layer and the base substrate.

Optionally, in a specific embodiment of the array substrate provided by the present disclosure, the patterned light-blocking layer and the pixel definition region completely coincide. This means that the patterned light-blocking layer and the pixel definition region are the same in shape and size.

Optionally, in a specific embodiment of the array substrate provided by the present disclosure, the patterned metal layer comprises a first patterned metal layer and a second patterned metal layer that are superimposed (i.e., located on different layers), and the patterned light-blocking layer comprises a first patterned light-blocking layer and a second patterned light-blocking layer that are superimposed (i.e., located on different layers). In this case, particularly, the first patterned light-blocking layer and the first patterned metal layer are formed by one patterning process, and the second patterned light-blocking layer and the second patterned metal layer are formed by one patterning process.

According to an embodiment of the present disclosure, a display panel is provided, comprising: the array substrate as mentioned in any of the above embodiments and a color filter substrate. Further optionally, when the patterned light-blocking layer in the array substrate only allows passage of light in one polarization direction, the display panel further comprises a polarizer arranged on the array substrate, wherein the polarization direction of light that the patterned light-blocking layer allows to pass therethrough is perpendicular to a transmission axis of the polarizer.

According to an embodiment of the present disclosure, a display device is provided, comprising: the display panel as mentioned in any of the above embodiments and a backlight source, wherein the color filter substrate in the display panel is closer to the backlight source than the array substrate is.

According to an embodiment of the present disclosure, a manufacturing method for an array substrate is provided, wherein the array substrate comprises a display area and a non-display area, wherein the display area comprises a plurality of pixel regions and a pixel definition region between various pixel regions. Specifically, the manufacturing method comprises steps of: forming a non-metallic light-blocking thin film on the base substrate; forming a patterned light-blocking layer in the pixel definition region by a patterning process; and forming a patterned metal layer on a light incident side of the patterned light-blocking layer, wherein an orthogonal projection of the patterned light-blocking layer on the pixel definition region at least partially overlaps that of the patterned metal layer on the pixel definition region.

According to an embodiment of the present disclosure, a manufacturing method for an array substrate is provided, wherein the array substrate comprises a display area and a non-display area, wherein the display area comprises a plurality of pixel regions and a pixel definition region between various pixel regions. Specifically, the manufacturing method comprises at least one of steps as follows: forming a first light-blocking thin film and a first metal thin film on the base substrate sequentially, and patterning the first light-blocking thin film and the first metal thin film simultaneously to form a first patterned light-blocking layer and a first patterned metal layer that are superimposed, wherein the first patterned metal layer comprises gate lines and a gate electrode; and forming a second light-blocking thin film and a second metal thin film on the base substrate sequentially, and patterning the second light-blocking thin film and the second metal thin film simultaneously to form a second patterned light-blocking layer and a second patterned metal layer that are superimposed, wherein the second patterned metal layer comprises data lines and a source-drain electrode.

BRIEF DESCRIPTION OF THE DRAWINGS

In order to illustrate technical solutions in embodiments of the present disclosure more clearly, drawings will be briefly introduced as follows. Apparently, the drawings in the depiction below only show some embodiments of the present disclosure. For a person having ordinary skills in the art, other suitable embodiments can also be obtained from these drawings without any inventive efforts.

FIG. 5 is a schematic structure view for a liquid crystal display panel according to an embodiment of the present disclosure;

FIG. 6 is a flow diagram of a manufacturing method for an array substrate according to an embodiment of the present disclosure;

DETAILED DESCRIPTION OF THE EMBODIMENTS

Figure 1:
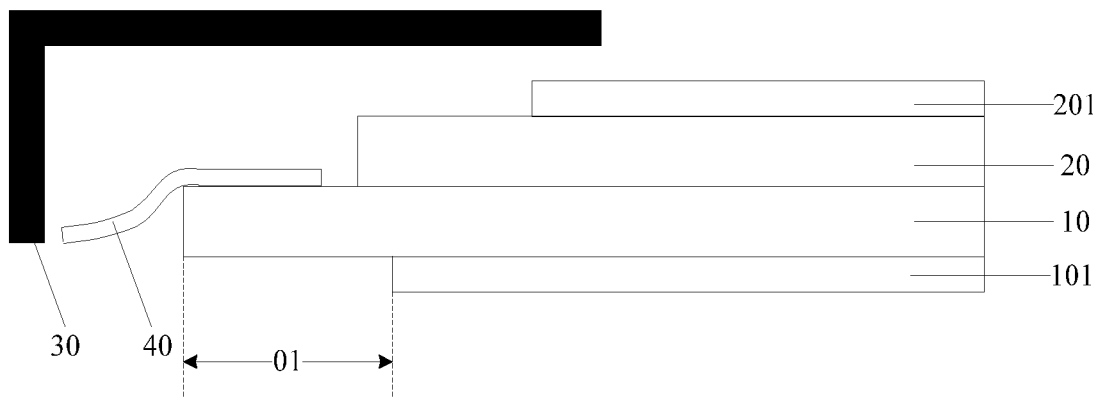
FIG. 1 is a schematic structure view for a liquid crystal display panel according to the prior art.

The technical solutions in embodiments of the present disclosure will be described clearly and completely as follows with reference to the drawings. Obviously, the described embodiments are only part of the embodiments of the present disclosure, instead of all. Based on the depictions herein, all other embodiments, obtainable by a person having ordinary skills in the art without any inventive efforts, shall fall within the protection scope of the present disclosure.

In the following drawings, reference numerals are used as follows to refer to components in the array substrate, the display panel or the display device: 01—wiring area; 02—display area; 03—pixel region; 04—pixel definition region; 10—array substrate; 101—first polarizer (polarizer); 20—color filter substrate; 201—second polarizer; 30—bezel; 40—chip-on-film (COF); 50—patterned metal layer; 60—base substrate; 70—patterned light-blocking layer; 80—liquid crystal layer; 90—first light-blocking thin film; and 100—first metal thin film.

Figure 2:
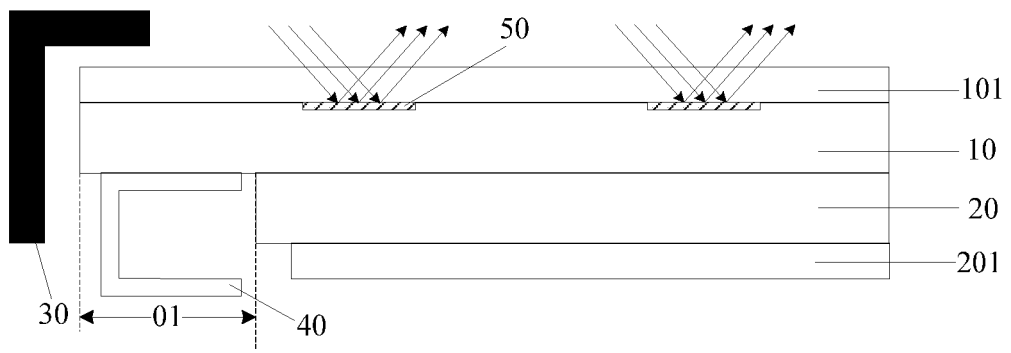
FIG. 2 is a schematic structure view for another liquid crystal display panel according to the prior art.

As shown in FIG. 1 and FIG. 2, typically, a liquid crystal display panel comprises: an array substrate 10, a color filter substrate 20, a liquid crystal layer (not shown in FIG. 1 and FIG. 2) arranged between the array substrate 10 and the color filter substrate 20, a first polarizer 101 arranged on the array substrate 10, and a second polarizer 201 arranged on the color filter substrate 20. Specifically, the array substrate 10 is further provided with gate lines for controlling a gate electrode and data lines for controlling a pixel electrode. Generally, the gate lines and the data lines are mostly formed of metallic materials having a high conductivity, such as aluminum (Al) or copper (Cu), so as to promote the charging rate of pixels and reduce the line width and the resistance of wires.

As shown in FIG. 1, in a conventional solution, the color filter substrate 20 is generally arranged on a light emergent side, and the array substrate 10 is arranged on a light incident side. Furthermore, the pixel definition region can be shielded by a black matrix (BM for short) on the color filter substrate 20, and thereby patterned metal layers that reflect light easily (e.g., the gate lines, the gate electrode, the data lines or the source-drain electrode) can be shielded. In this way, the quality and contrast of the product can be improved. However, as shown in FIG. 1, generally, the bezel 30 not only needs to wrap the wiring area (Pad area) 01 on the periphery of the array substrate 10, but also needs to overlap the second polarizer 201 on the color filter substrate 20 to some extent, so as to protect the chip-on-film (COF) 40 and prevent peripheral leakage of light. As can be seen, the bezel 30 covers a relatively large area, and thus the general bezel of the liquid crystal display device has a large size. Therefore, it cannot achieve a narrow bezel design. In light of this, the structure as shown in FIG. 2 is mostly adopted nowadays, in order to achieve a super-narrow bezel or even bezel-less design. Specifically, the array substrate 10 is arranged on the light emergent side while the color filter substrate 20 is arranged on the light incident side, and the COF 40 is curved inwards. In this way, the size of the bezel 30 is greatly reduced, and the potential implementation of a bezel-less design is further facilitated.

However, as shown in FIG. 2, if the array substrate 10 is arranged on the light emergent side, the patterned metal layer 50 on the array substrate 10 will strongly reflect light when subjected to intense light (as indicated by an arrow in FIG. 2) due to its high reflectivity. This will typically reduce the quality and contrast of the product.

Figure 3:
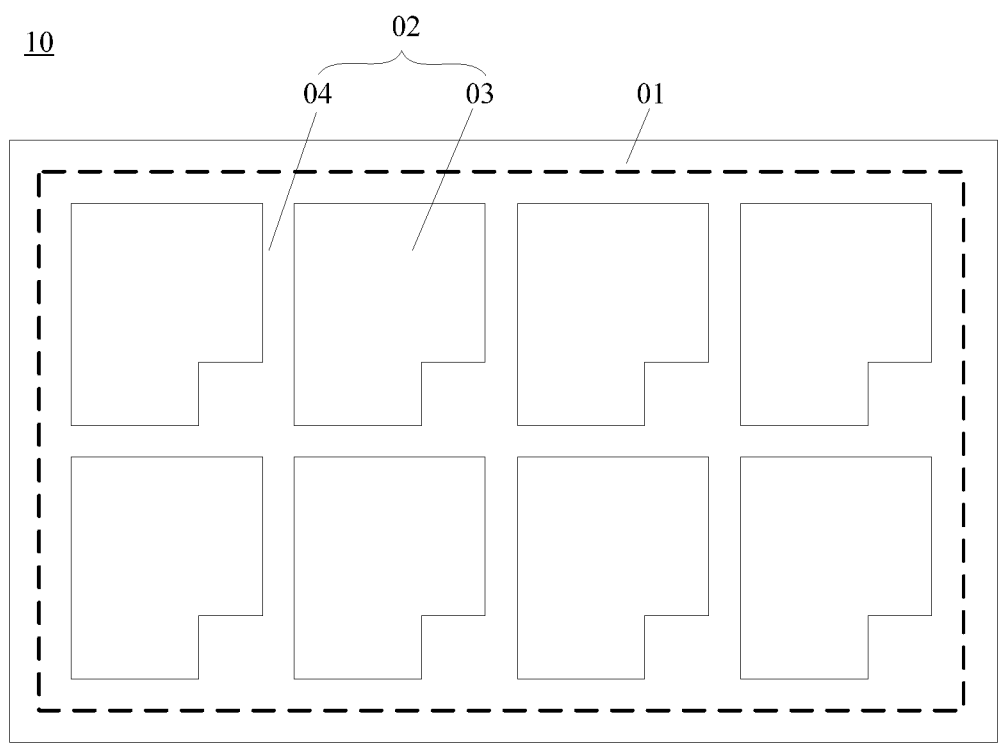
FIG. 3 is a schematic structure view for an array substrate according to an embodiment of the present disclosure.
Figure 4A:
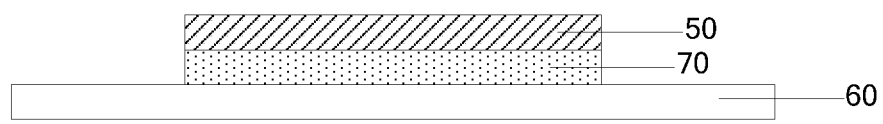
FIG. 4(a) is a schematic structure view for an array substrate according to another embodiment of the present disclosure.
Figure 4B:
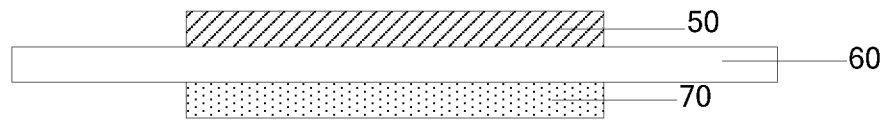
FIG. 4(b) is a schematic structure view for an array substrate according to yet another embodiment of the present disclosure.

An embodiment of the present disclosure provides an array substrate 10. As shown in FIG. 3, the array substrate 10 comprises a display area 02 and a non-display area (which is also called a wiring area 01 herein), wherein the display area 02 is divided into pixel regions 03 and a pixel definition region 04 between various pixel regions 03. As shown in FIG. 4(a) and FIG. 4(b), the array substrate 10 further comprises a base substrate 60 as well as a patterned metal layer 50, i.e., metal patterns, formed in the pixel definition region 04 on the base substrate 60. Besides, the array substrate 10 further comprises a patterned light-blocking layer 70, i.e., light-blocking patterns, formed in the pixel definition region 04 and superimposed on the patterned metal layer 50. Specifically, an orthogonal projection of the patterned light-blocking layer 70 on the pixel definition region 04 at least partially overlaps that of the patterned metal layer 50 on the pixel definition region 04. Optionally, the patterned light-blocking layer 70 is configured to block visible light or only allow passage of light in one polarization direction. Besides, the material of the patterned light-blocking layer 70 comprises non-metallic materials.

It should be noted that the pixel regions 03 refer to light-transmissive regions in the display area 02, which can also be called opening regions. In the display area 02, regions other than the pixel regions 03 are defined as a pixel definition region 04, i.e., a non-light-transmissive region in the display area 02.

It should be further pointed out that, as can be easily understood by those skilled in the art, the array substrate 10 can further comprise a thin film transistor and a pixel electrode, wherein the thin film transistor specifically comprises a gate electrode, a gate insulating layer, a source electrode and a drain electrode, wherein the drain electrode is electrically connected with the pixel electrode. Moreover, the array substrate 10 can further comprise gate lines and data lines arranged to be insulated from and intersect with each other. Obviously, the array substrate 10 can further comprise a common electrode. The present disclosure only schematically shows in the drawings of the description film layers of the array substrate 10 related to the inventive concept, but does not show other film layers. Besides, the type of the patterned metal layer 50 on the array substrate 10 is not limited at all in the present disclosure. For example, the patterned metal layer 50 can be at least one of the gate lines, the gate electrode, the data lines and the source-drain electrode.

Furthermore, it should be further noted that the display panel generally comprises an array substrate 10 and a color filter substrate 20 aligned with the array substrate 10, as shown in FIG. 5. In this case, the light incident side of the display panel is an upper side, and an external side of the patterned metal layer 50 refers to a side of the patterned metal layer 50 remote from the color filter substrate 20, while a side of the patterned metal layer 50 closer to the color filter substrate 20 is namely an internal side of the patterned metal layer 50. In view of this, the patterned light-blocking layer 70 is formed on the light incident side of the display panel, i.e., on the external side of the patterned metal layer 50. For example, with reference to FIG. 4(a), the patterned light-blocking layer 70 is formed between the patterned metal layer 50 and the base substrate 60. Alternatively, with reference to FIG. 4(b), the patterned light-blocking layer 70 is formed on a side of the base substrate 60 facing away from the patterned metal layer 50.

Besides, it should be further noted that an orthogonal projection of the patterned light-blocking layer 70 on the pixel definition region 04 at least partially overlaps that of the patterned metal layer 50 on the pixel definition region 04. This means that orthogonal projections of the patterned light-blocking layer 70 and the patterned metal layer 50 can overlap each other partially or completely. Those skilled in the art should be clear that an orthogonal projection refers to a perpendicular projection on a projection surface. In the present application, this means that the patterned light-blocking layer 70 and the patterned metal layer 50 are projected in a direction perpendicular to the pixel definition region 04.

At last, it should be emphasized that when the patterned light-blocking layer 70 is used for blocking visible light, materials of the patterned light-blocking layer 70 can be the same as that of the black matrix pattern on the color filter substrate 20. For example, the patterned light-blocking layer 70 can be black resin. In this case, since the material of the patterned light-blocking layer 70 is a non-metallic material, it will not reflect light, or the reflection can be omitted. In this way, the patterned light-blocking layer 70 can prevent light from irradiating the patterned metal layer 50 that overlaps the patterned light-blocking layer 70, and thereby prevent reflection on the patterned metal layer 50. Similarly, when the patterned light-blocking layer 70 only allows passage of light in one polarization direction, the patterned light-blocking layer 70 has the same function as the polarizer, and the light passing through the patterned light-blocking layer 70 is linearly polarized light.

Besides, if the patterned light-blocking layer 70 only partially overlaps the patterned metal layer 50, and the patterned light-blocking layer 70 is used for blocking visible light, the patterned light-blocking layer 70 can not only prevent light from irradiating the corresponding patterned metal layer 50, but also prevent the part of patterned metal layer 50 not overlapping the patterned light-blocking layer 70 from reflecting light.

In light of the above discussion, in the array substrate 10 provided by an embodiment of the present disclosure, the patterned metal layer 50 and the patterned light-blocking layer 70 are superimposed in the pixel definition region 04, and the material of the patterned light-blocking layer 70 is a non-metallic material. In this way, if the array substrate 10 is arranged on the light emergent side of the display panel, reflection of light by the corresponding patterned metal layer 50 can be effectively prevented due to the existence of the patterned light-blocking layer 70. Specifically, when the patterned light-blocking layer 70 is configured to block visible light, the patterned light-blocking layer 70 can prevent light from irradiating the patterned metal layer 50 that overlaps the patterned light-blocking layer 70, and thereby prevent reflection on the patterned metal layer 50. In this way, reduce of the quality and contrast of the product can be avoided. Similarly, when the patterned light-blocking layer 70 only allows passage of light in one polarization direction, and the array substrate 10 is further provided with a polarizer, the light passing through the polarizer on the array substrate 10 is linearly polarized light. In this case, the transmission axis of the polarizer is perpendicular to the polarization direction of the light that the patterned light-blocking layer 70 allows to pass therethrough. Thus, when the linearly polarized light passing through the polarizer irradiates the patterned light-blocking layer 70, it will be blocked by the patterned light-blocking layer 70. Therefore, light cannot irradiate the patterned metal layer 50 that overlaps the patterned light-blocking layer 70. This helps to prevent reflection on the patterned metal layer 50, and thus avoid reducing the quality and contrast of the product.

In an optional embodiment, the patterned light-blocking layer 70 only allows passage of light in one polarization direction, and is made of a rod quantum dot material. In this case, a long-axis direction of the rod quantum dots is the same as the polarization direction of the light that the patterned light-blocking layer 70 allows to pass therethrough.

According to other examples of the above embodiment, if the long axis of the rod quantum dots is arranged along a certain direction to form a rod quantum dot layer (i.e., the patterned light-blocking layer 70), the rod quantum dot layer will have a directional selectivity. In other words, the rod quantum dot layer will allow passage of light in parallel to the long-axis direction of the rod quantum dots. Therefore, when the material of the patterned light-blocking layer 70 is a rod quantum dot material, light passing through the patterned light-blocking layer 70 will be linearly polarized light.

In an embodiment of the present disclosure where the patterned light-blocking layer 70 only allows passage of light in one polarization direction, when the patterned light-blocking layer 70 is used in combination with a polarizer, and the transmission axis of the polarizer is made perpendicular to the polarization direction of the light that the patterned light-blocking layer 70 allows to pass therethrough, the light passing through the polarizer on the array substrate 10 will be prevented from irradiating the patterned metal layer 50 that overlaps the patterned light-blocking layer 70. Hence, reflection on the patterned metal layer 50 will be prevented.

Further optionally, the patterned light-blocking layer 70 is further configured to block visible light and is made of black resin.

Specifically, when the patterned light-blocking layer 70 is used for blocking visible light, the material of the patterned light-blocking layer 70 can be the same as that of the black matrix pattern, e.g., black resin.

In an embodiment of the present disclosure, when the material of the patterned light-blocking layer 70 is black resin, the black resin can prevent light from irradiating the patterned metal layer 50 that overlaps the patterned light-blocking layer 70. Thereby, reflection on the patterned metal layer 50 can be avoided. Furthermore, when the patterned light-blocking layer 70 and the pixel definition region 04 are the same in shape and size, the patterned light-blocking layer 70 can serve as a black matrix pattern on the color filter substrate 20.

Optionally, as shown in FIG. 4(a) and FIG. 4(b), an orthogonal projection of the patterned metal layer 50 completely covers that of the patterned light-blocking layer 70. That is, the border of the patterned metal layer 50 falls within the border of the patterned light-blocking layer 70.

Specifically, the border of the patterned metal layer 50 falling within the border of the patterned light-blocking layer 70 can mean that the border of the patterned metal layer 50 and the border of the patterned light-blocking layer 70 coincide, or that the border of the patterned metal layer 50 is enclosed by the border of the patterned light-blocking layer 70.

In an embodiment of the present disclosure where the border of the patterned metal layer 50 falls within the border of the patterned light-blocking layer 70, the patterned light-blocking layer 70 can completely shield the patterned metal layer 50. Therefore, the ambient light is prevented from irradiating the patterned metal layer 50 and being reflected thereon.

In an embodiment of the present disclosure, if the patterned light-blocking layer 70 is formed on a side of the base substrate 60 facing away from the patterned metal layer 50, and the array substrate 10 is further provided with a polarizer, the polarizer will be formed on the patterned light-blocking layer 70. In this case, since the patterned light-blocking layer 70 is formed only in the pixel definition region 04, the polarizer will be uneven if it is formed on the patterned light-blocking layer 70. This in turn affects the performance of the liquid crystal display panel. In view of this, in an embodiment of the present disclosure, optionally, the patterned light-blocking layer 70 is formed between the patterned metal layer 50 and the base substrate 60, as shown in FIG. 4(a).

Optionally, the patterned light-blocking layer 70 and the pixel definition region 04 are the same in shape and size. It should be noted that, the patterned light-blocking layer 70 and the pixel definition region 04 being the same in shape and size can mean that they are completely the same, or approximately the same.

In an embodiment of the present disclosure, the patterned light-blocking layer 70 and the pixel definition region 04 are the same or approximately the same in shape and size. In light of this, on one hand, the patterned light-blocking layer 70 can completely shield the pixel definition region 04. Therefore, when the ambient light irradiates the pixel definition region 04, reflection of light by the patterned metal within the pixel definition region 04 can be avoided. On the other hand, since the patterned light-blocking layer 70 and the pixel definition region 04 are the same or approximately the same in shape and size, it is only necessary to manufacture one patterned light-blocking layer 70 for the purpose of shielding all patterned metal layers 50. This can simplify the manufacture process of the array substrate 10, as compared with the case where the patterned light-blocking layer 70 is manufactured on the external side of each patterned metal layer 50.

Optionally, in a specific embodiment, the patterned metal layer 50 comprises a first patterned metal layer and a second patterned metal layer that are located on different layers. Similarly, the patterned light-blocking layer 70 comprises a first patterned light-blocking layer and a second patterned light-blocking layer that are located on different layers. Besides, the first patterned light-blocking layer and the first patterned metal layer are formed by one patterning process, while the second patterned light-blocking layer and the second patterned metal layer are formed by one patterning process.

In this embodiment, types of the first patterned metal layer and the second patterned metal layer are not limited. Exemplarily, the first patterned metal layer can comprise gate lines and a gate electrode, while the second patterned metal layer can comprise data lines and a source-drain electrode. Alternatively, the first patterned metal layer can comprise data lines and a source-drain electrode, while the second patterned metal layer can comprise gate lines and a gate electrode.

In an embodiment of the present disclosure, the first patterned light-blocking layer and the first patterned metal layer are formed by one patterning process, so that the first patterned light-blocking layer and the first patterned metal layer are the same in shape and size. In this case, when the array substrate 10 is arranged on the light emergent side of the liquid crystal display panel, the first patterned light-blocking layer can completely shield the first patterned metal layer, thereby preventing light from irradiating the first patterned metal layer and avoiding reflection on the first patterned metal layer. Likewise, the second patterned light-blocking layer and the second patterned metal layer are formed by one patterning process, so that the second patterned light-blocking layer and the second patterned metal layer are the same in shape and size. In light of this, when the array substrate 10 is arranged on the light emergent side of the display panel, the second patterned light-blocking layer can completely shield the second patterned metal layer, thereby preventing light from irradiating the second patterned metal layer and avoiding reflection on the second patterned metal layer.

In view of above, the manufacture process of the array substrate can be simplified, because the first patterned light-blocking layer and the first patterned metal layer are formed by one patterning process, and the second patterned light-blocking layer and the second patterned metal layer are formed by one patterning process.

An embodiment of the present disclosure further provides a display panel. As shown in FIG. 5, the display panel comprises the array substrate 10 as mentioned in any of the above embodiments and a color filter substrate 20. Furthermore, in a specific embodiment, the patterned light-blocking layer 70 on the array substrate only allows passage of light in one polarization direction. In this case, the display panel further comprises a polarizer 101 arranged on the array substrate 10, wherein a transmission axis of the polarizer 101 is perpendicular to the polarization direction of the light that the patterned light-blocking layer 70 allows to pass therethrough.

Specifically, as shown in FIG. 5, apart from the array substrate 10 and the color filter substrate 20, the liquid crystal display panel further comprises a liquid crystal layer 80 filled between the array substrate 10 and the color filter substrate 20. Herein, when the array substrate 10 is arranged on the light emergent side of the liquid crystal display panel, the color filter substrate 20 can be the same as the color filter substrate 20 in the prior art, i.e., comprising a color film layer and a black matrix pattern. Obviously, when the material of the patterned light-blocking layer 70 is black resin, and the patterned light-blocking layer 70 and the pixel definition layer 01 are the same in shape and size, optionally, the black matrix pattern on the color filter substrate 20 can be omitted, because a patterned light-blocking layer 70 has been manufactured on the array substrate 10. This simplifies the manufacture process of the display panel.

It should be noted that in the description of the present disclosure, FIG. 5 only shows structures related to the inventive concept, but does not show other structures. In the description of the present disclosure and the drawings of the description, the polarizer 101 arranged on the array substrate 10 refers to a first polarizer 101.

An embodiment of the present disclosure further provides a display panel. Specifically, the display panel comprises an array substrate 10, wherein a patterned light-blocking layer 70 is formed on the external side of the patterned metal layer 50 of the array substrate, and the patterned light-blocking layer 70 is made of a non-metallic material. In this way, if the array substrate 10 is arranged on the light emergent side of the display panel, reflection of light by the corresponding patterned metal layer 50 can be effectively prevented due to the existence of the patterned light-blocking layer 70. Specifically, when the patterned light-blocking layer 70 is configured to block visible light, the patterned light-blocking layer 70 can prevent light from irradiating the patterned metal layer 50 that overlaps the patterned light-blocking layer 70, thereby preventing reflection on the patterned metal layer 50, and thus avoiding reduce of the quality and contrast of the product. Similarly, when the patterned light-blocking layer 70 only allows passage of light in one polarization direction, and the array substrate 10 is further provided with a polarizer 101, the light passing through the polarizer 101 on the array substrate 10 is linearly polarized light. In this case, since the transmission axis of the polarizer 101 is perpendicular to the polarization direction of the light that the patterned light-blocking layer 70 allows to pass therethrough, the linearly polarized light will be blocked by the patterned light-blocking layer 70 when passing through the polarizer 101 and irradiating the patterned light-blocking layer 70. Therefore, light cannot irradiate the patterned metal layer 50 that overlaps the patterned light-blocking layer 70. This can prevent reflection on the patterned metal layer 50, and thus avoid reducing the quality and contrast of the product.

An embodiment of the present disclosure further provides a display device. Specifically, the display device comprises the display panel as mentioned in any of the above embodiments and a backlight source, wherein the color filter substrate 20 of the display panel is closer to the backlight source than the array substrate 10 is.

Herein, in the display panel, the color filter substrate 20 is closer to the backlight source than the array substrate 10 is. In other words, the color filter substrate 20 is arranged on the light incident side of the display panel, and the array substrate 10 is arranged on the light emergent side of the display panel. By arranging the array substrate 10 on the light emergent side of the display panel and the color filter substrate 20 on the light incident side of the display panel, the size of the bezel can be reduced. Thereby, a narrow-bezel or even bezel-less design of the display device can be achieved, and the competition of the display device can be increased.

The display device as provided in embodiments of the present disclosure can be any device. For example, it can display motion images (e.g., video) or still images, and it can further display words or pictures. To be more specific, it is foreseeable that any of the above embodiments can be applied in multiple electronic devices or associated with multiple electronic devices. These electronic devices comprise for example, but are not limited to, a mobile phone, a wireless device, a personal data assistant (PDA), a hand-held or portable computer, a GPS receiver or navigator, a camera, an MP3 player, a camera, a game console, a watch, a clock, a calculator, a TV monitor, a tablet display, a computer monitor, an automobile display (e.g., odometer display etc.), a navigator, a cabin controller and/or display, a display of camera views (e.g., a display of a rear-view camera in vehicles), an electronic photo, an electronic billboard or sign, a projector, an architectural structure, a packaging and aesthetic structure (e.g., a display for displaying images of a jewelry) and so on. Obviously, the electronic devices can further be a display component like a liquid crystal display panel.

An embodiment of the present disclosure provides a display device. Specifically, the display device comprises an array substrate 10, wherein a patterned light-blocking layer 70 is formed on the external side of the patterned metal layer 50 of the array substrate 10, and the patterned light-blocking layer 70 is made of a non-metallic material. In this way, if the array substrate 10 is arranged on the light emergent side of the display panel, reflection of light by the corresponding patterned metal layer 50 can be effectively prevented due to the existence of the patterned light-blocking layer 70. In this case, the patterned light-blocking layer 70 is further configured to block visible light or only allow passage of light in one polarization direction. This can prevent light from irradiating the patterned metal layer 50 that overlaps the patterned light-blocking layer 70, thereby preventing reflection on the patterned metal layer 50 and avoiding reduce in the quality and contrast of the product.

An embodiment of the present disclosure further provides a manufacturing method for an array substrate. As shown in FIG. 6, the manufacturing method comprises steps as follows.

Figure 7A:
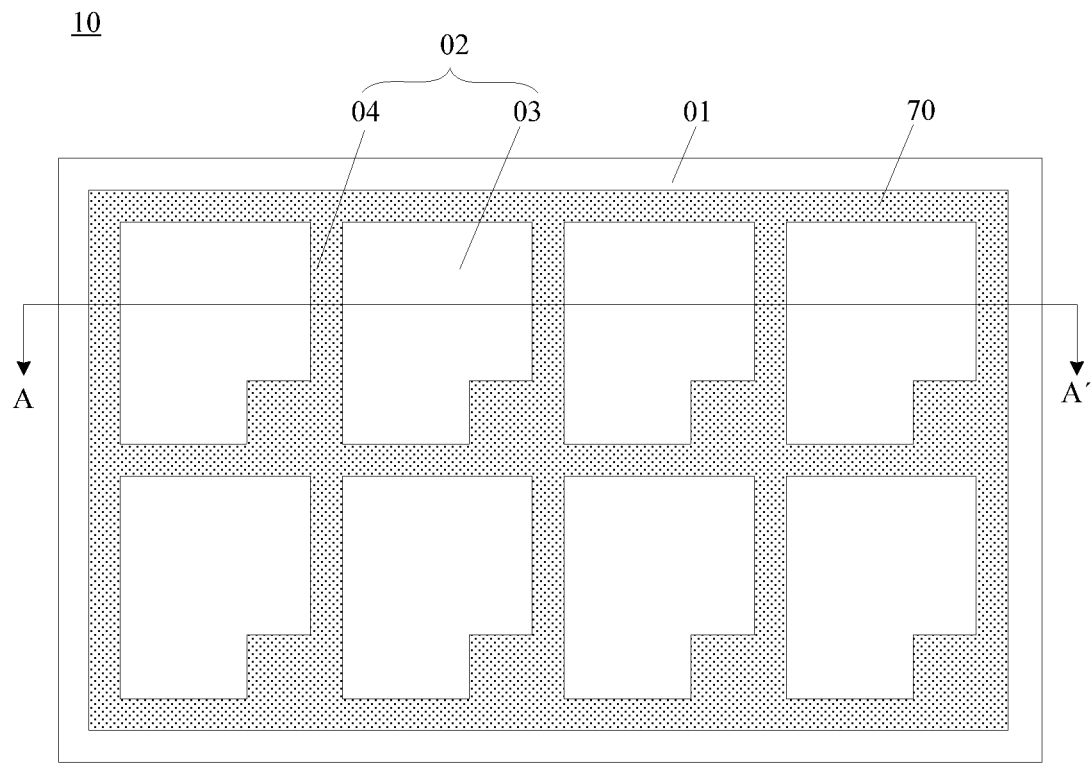
FIG. 7(a) is a schematic structure view for a patterned light-blocking layer formed in the pixel definition region of the array substrate according to an embodiment of the present disclosure.
Figure 7B:
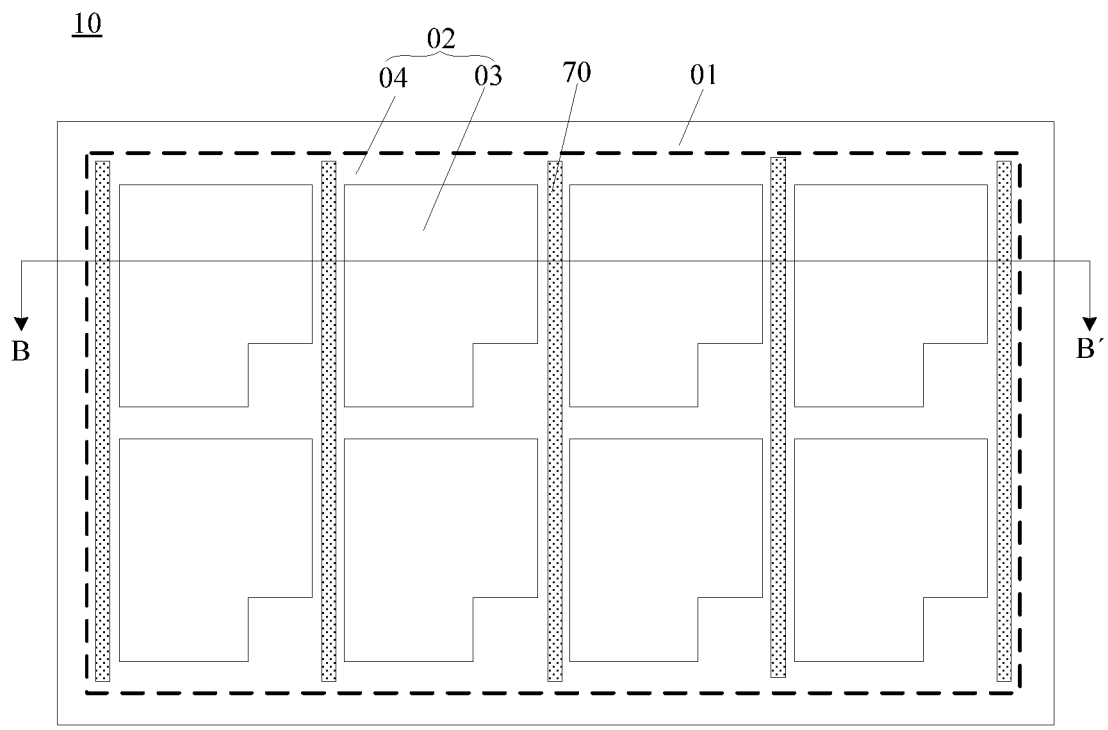
FIG. 7(b) is a schematic structure view for a patterned light-blocking layer formed in the pixel definition region of the array substrate according to another embodiment of the present disclosure.
Figure 8:
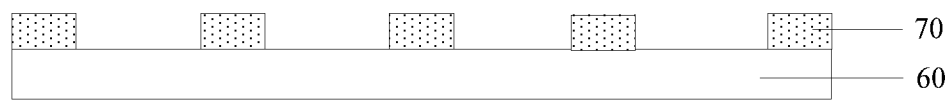
FIG. 8 is a sectional view along line AA' in FIG. 7(a) or along line BB' in FIG. 7(b)

In Step S100, as shown in FIG. 7 and FIG. 8, a non-metallic light-blocking thin film is formed on the base substrate 60, and a patterned light-blocking layer 70 is formed in the pixel definition region 04 by a patterning process.

Optionally, the patterned light-blocking layer 70 is configured to block visible light or only allow passage of light in one polarization direction.

In the above embodiment, the size and shape of the patterned light-blocking layer 70 are not limited at all. Specifically, as shown in FIG. 7(*a*), the patterned light-blocking layer 70 and the pixel definition region 04 are the same or approximately the same in size and shape. Alternatively, as shown in FIG. 7(*b*), it is ensured that the patterned light-blocking layer 70 and the patterned metal layer 50 formed subsequently have overlapping projections in the pixel definition region 04.

Herein, a light-blocking thin film can be formed on the base substrate 60 by evaporation, and a patterned light-blocking layer 70 can be formed in the pixel definition region 04 by exposure, developing and etching. When the material of the patterned light-blocking layer 70 is a rod quantum dot material, the long-axis of the rod quantum dots is arranged along a certain direction. In the subsequent process, if a polarizer is to be attached, the transmission axis of the polarizer is perpendicular to the long-axis direction of the rod quantum dots.

Figure 9:
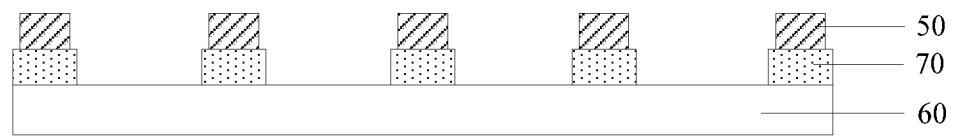
FIG. 9 is a schematic structure view for a patterned light-blocking layer and a patterned metal layer formed on the base substrate according to an embodiment of the present disclosure.

In Step S101, as shown in FIG. 9, a patterned metal layer 50 is formed on the light incident side of the patterned light-blocking layer 70, wherein an orthogonal projection of the patterned light-blocking layer on the pixel definition region at least partially overlaps that of the patterned metal layer on the pixel definition region.

Specifically, the step of forming a patterned metal layer 50 can comprise: firstly forming a metal thin film, then applying a photoresist on the metal thin film, and performing an exposure process by using a corresponding mask plate. After that, a metal pattern 50 is formed by developing and etching.

It should be noted that the array substrate can comprise a plurality of patterned metal layers 50 located on different layers. In this way, if the patterned light-blocking layer 70 and the pixel definition region 04 are the same or approximately the same in size and shape, the plurality of patterned metal layers 50 can be shielded completely, since the patterned light-blocking layer 70 completely shields the pixel definition region 04. As can be seen, it is only necessary to form other patterned metal layers 50 after step S101. Alternatively, if the patterned light-blocking layer 70 has a relative small size and can only overlap one patterned metal layer 50, step S100 and step S101 can be repeated such that each patterned metal layer 50 overlaps a patterned light-blocking layer 70.

An embodiment of the present disclosure provides a manufacturing method for an array substrate. A patterned light-blocking layer 70 is formed on the light incident side of the patterned metal layer 50, and the patterned light-blocking layer 70 is made of a non-metallic material. In this way, if the array substrate 10 is arranged on the light emergent side of the display panel, reflection of light by the corresponding patterned metal layer 50 can be effectively prevented due to the existence of the patterned light-blocking layer 70. Specifically, when the patterned light-blocking layer 70 is configured to block visible light, the patterned light-blocking layer 70 can prevent light from irradiating the patterned metal layer 50 that overlaps the patterned light-blocking layer 70, thereby preventing reflection on the patterned metal layer 50, and thus avoiding reduce in the quality and contrast of the product. Similarly, when the patterned light-blocking layer 70 only allows passage of light in one polarization direction, and the array substrate 10 is further provided with a polarizer 101, the light passing through the polarizer 101 on the array substrate 10 is linearly polarized light. Based on that, the transmission axis of the polarizer 101 is perpendicular to the polarization direction of the light that the patterned light-blocking layer 70 allows to pass therethrough. Thus, when the linearly polarized light passing through the polarizer irradiates the patterned light-blocking layer 70, it will be blocked by the patterned light-blocking layer 70. Therefore, light cannot irradiate the patterned metal layer 50 that overlaps the patterned light-blocking layer 70. This can prevent reflection on the patterned metal layer 50, and thus avoid reducing the quality and contrast of the product.

An embodiment of the present disclosure further provides a manufacturing method for an array substrate, comprising steps as follows.

Figure 10:
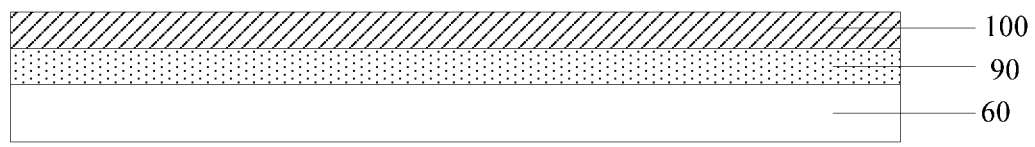
FIG. 10 is a schematic structure view for a first light-blocking thin film and a first metal thin film formed on the base substrate according to an embodiment of the present disclosure.

As shown in FIG. 10, a first light-blocking thin film 90 and a first metal thin film 100 are formed sequentially on the base substrate 60, and the first light-blocking thin film 90 and the first metal thin film 100 are patterned simultaneously so as to form a first patterned light-blocking layer and a first patterned metal layer that are superimposed (as shown in FIG. 4(*a*)), wherein the first patterned metal layer comprises gate lines and a gate electrode. Alternatively, a second light-blocking thin film and a second metal thin film are formed sequentially on the base substrate 60, and the second light-blocking thin film and the second metal thin film are patterned simultaneously so as to form a second patterned light-blocking layer and a second patterned metal layer that are superimposed, wherein the second patterned metal layer comprises data lines and a source-drain electrode.

Specifically, it is possible to only form the first patterned metal layer and the first patterned light-blocking layer on the base substrate 60. Alternatively, it is also possible to only form the second patterned metal layer and the second patterned light-blocking layer on the base substrate 60. Apparently, those skilled in the art should understand that it is possible to form the first patterned metal layer and the first patterned light-blocking layer on the base substrate 60 first and then form the second patterned metal layer and the second patterned light-blocking layer. When the second patterned metal layer and the second patterned light-blocking layer are also formed on the base substrate 60 in addition to the first patterned metal layer and the first patterned light-blocking layer, the forming sequence of these patterned layers is not limited at all. For example, it is possible to first form the first patterned light-blocking layer and the first patterned metal layer on the base substrate 60. Alternatively, it is also possible to first form the second patterned light-blocking layer and the second patterned metal layer on the base substrate 60.

Herein, patterning the first light-blocking thin film 90 and the first metal thin film 100 specifically comprises exposing, developing and etching the first light-blocking thin film 90 and the first metal thin film 100, thereby forming a first patterned light-blocking layer and a first patterned metal layer that are superimposed. Based on a similar concept, patterning the second light-blocking thin film and the second metal thin film specifically comprises exposing, developing and etching the second light-blocking thin film and the second metal thin film, thereby forming a second patterned light-blocking layer and a second patterned metal layer that are superimposed.

An embodiment of the present disclosure further provides a manufacturing method for an array substrate. Specifically, an array substrate 10 is arranged on the light emergent side of the display panel, and a first patterned light-blocking layer is formed on the light incident side of the first patterned metal layer. In this way, when the first patterned light-blocking layer is configured to block visible light, the first patterned light-blocking layer can prevent light from irradiating the first patterned metal layer, thereby preventing reflection of light by the first patterned metal layer, and thus avoiding reduce in the quality and contrast of the product. Similarly, when the first patterned light-blocking layer only allows passage of light in one polarization direction, and the array substrate 10 is further provided with a polarizer 101, the light passing through the polarizer 101 of the array substrate 10 is linearly polarized light. In this case, the transmission axis of the polarizer 101 is perpendicular to the polarization direction of the light that the first patterned light-blocking layer allows to pass therethrough. Thus, when the linearly polarized light passing through the polarizer irradiates the first patterned light-blocking layer, it will be blocked by the first patterned light-blocking layer. Therefore, light cannot irradiate the first patterned metal layer. This can prevent reflection of light by the first patterned metal layer, and thus avoid reducing the quality and contrast of the product. Similarly, the second patterned light-blocking layer can prevent light from irradiating the second patterned metal layer. This can prevent reflection of light by the second patterned metal layer, and thus avoid reducing the quality and contrast of the product.

To sum up, according to an embodiment of the present disclosure, by forming the first patterned light-blocking layer and the first patterned metal layer simultaneously by a patterning process, and/or forming the second patterned light-blocking layer and the second patterned metal layer simultaneously by a patterning process, the manufacture process of the array substrate can be simplified.

The above description is only specific embodiments of the present disclosure, but the protection scope of the present disclosure is not limited thereto. Any variation or substitution, easily conceivable within the technical scope disclosed in the present disclosure for a skilled person who is familiar with this technical field, shall fall within the protection scope of the present disclosure. Therefore, the protection scope of the present disclosure shall be subject to the protection scope of the appended claims.

The invention claimed is:

1. An array substrate, comprising a display area and a non-display area,
    wherein the display area comprises a plurality of pixel regions and a pixel definition region between various pixel regions,
    wherein the array substrate further comprises a base substrate, as well as a patterned metal layer and a patterned light-blocking layer superimposed in the pixel definition region on the base substrate, wherein the patterned light-blocking layer is closer to a light incident side of the array substrate than the patterned metal layer is,
    wherein the patterned light-blocking layer is made of a non-metallic material,
    wherein an orthogonal projection of the patterned light-blocking layer on the pixel definition region at least partially overlaps that of the patterned metal layer on the pixel definition region, and
    wherein the patterned light-blocking layer is made of a rod quantum dot material and only allows passage of light in one polarization direction, and a long-axis direction of rod quantum dots in the rod quantum dot material is the same as said one polarization direction.

2. The array substrate according to claim 1, wherein an orthogonal projection of the patterned light-blocking layer on the pixel definition region completely covers that of the patterned metal layer on the pixel definition region.

3. The array substrate according to claim 2, wherein the patterned metal layer comprises a first patterned metal layer and a second patterned metal layer that are superimposed, and
    the patterned light-blocking layer comprises a first patterned light-blocking layer and a second patterned light-blocking layer that are superimposed, wherein
    the first patterned light-blocking layer and the first patterned metal layer are formed by one patterning process, and the second patterned light-blocking layer and the second patterned metal layer are formed by one patterning process.

4. The array substrate according to claim 1, wherein the patterned light-blocking layer is formed between the patterned metal layer and the base substrate.

5. The array substrate according to claim 4, wherein the patterned metal layer comprises a first patterned metal layer and a second patterned metal layer that are superimposed, and
    the patterned light-blocking layer comprises a first patterned light-blocking layer and a second patterned light-blocking layer that are superimposed, wherein
    the first patterned light-blocking layer and the first patterned metal layer are formed by one patterning process, and the second patterned light-blocking layer and the second patterned metal layer are formed by one patterning process.

6. The array substrate according to claim 1, wherein the patterned light-blocking layer and the pixel definition region completely coincide.

7. The array substrate according to claim 1, wherein the patterned metal layer comprises a first patterned metal layer and a second patterned metal layer that are superimposed, and
    the patterned light-blocking layer comprises a first patterned light-blocking layer and a second patterned light-blocking layer that are superimposed, wherein
    the first patterned light-blocking layer and the first patterned metal layer are formed by one patterning process, and the second patterned light-blocking layer and the second patterned metal layer are formed by one patterning process.

8. A display panel, comprising:
    the array substrate according to claim 1; and
    a color filter substrate.

9. The display panel according to claim 8, wherein
the patterned light-blocking layer on the array substrate only allows passage of light in one polarization direction, and
the display panel further comprises a polarizer arranged on the array substrate, wherein
a transmission axis of the polarizer is perpendicular to said one polarization direction.

10. A display device, comprising:
the display panel according to claim 8; and
a backlight source, wherein
the color filter substrate of the display panel is closer to the backlight source than the array substrate is.

11. A manufacturing method for an array substrate, wherein the array substrate comprises a display area and a non-display area, and the display area comprises a plurality of pixel regions and a pixel definition region between various pixel regions, the manufacturing method comprising steps of:
forming a non-metallic light-blocking thin film on the base substrate,
forming a patterned light-blocking layer in the pixel definition region by a patterning process, wherein the patterned light-blocking layer is made of a rod quantum dot material and only allows passage of light in one polarization direction, and a long-axis direction of rod quantum dots in the rod quantum dot material is the same as said one polarization direction, and
forming a patterned metal layer on a light incident side of the patterned light-blocking layer, wherein
an orthogonal projection of the patterned light-blocking layer on the pixel definition region at least partially overlaps that of the patterned metal layer on the pixel definition region.

12. A manufacturing method for an array substrate, wherein the array substrate comprises a display area and a non-display area, and the display area comprises a plurality of pixel regions and a pixel definition region between various pixel regions, the manufacturing method comprising at least one of steps of:

forming a first light-blocking thin film and a first metal thin film sequentially on the base substrate, and patterning the first light-blocking thin film and the first metal thin film simultaneously, so as to form a first patterned light-blocking layer and a first patterned metal layer that are superimposed, wherein the first patterned metal layer comprises gate lines and a gate electrode; and forming a second light-blocking thin film and a second metal thin film sequentially on the base substrate, and patterning the second light-blocking thin film and the second metal thin film simultaneously, so as to form a second patterned light-blocking layer and a second patterned metal layer that are superimposed, wherein the second patterned metal layer comprises data lines and a source-drain electrode, wherein the first patterned light-blocking layer and the second patterned light-blocking layer are made of a rod quantum dot material and only allows passage of light in one polarization direction, and a long-axis direction of rod quantum dots in the rod quantum dot material is the same as said one polarization direction.

* * * * *